United States Patent [19]
Fujii et al.

[11] Patent Number: 5,990,895
[45] Date of Patent: *Nov. 23, 1999

[54] THREE-DIMENSIONAL TO TWO DIMENSIONAL DATA PROCESSING AND CONVERSION DEVICE AND METHOD OF USING THE SAME

[75] Inventors: Eiro Fujii, Takatsuki; Shigeaki Imai, Uji; Koji Fujiwara, Sakai; Yoshiko Sakagawa, Takatsuki, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,623

[22] Filed: Jun. 18, 1996

[30] Foreign Application Priority Data

Jun. 22, 1995 [JP] Japan .................................. 7-156455

[51] Int. Cl.$^6$ .................................................. G06T 17/00
[52] U.S. Cl. .......................................... 345/419; 345/420
[58] Field of Search ................................... 345/419, 420, 345/435, 441

[56] References Cited

U.S. PATENT DOCUMENTS

| | | | |
|---|---|---|---|
| 4,845,651 | 7/1989 | Aizawa | 382/285 |
| 4,937,768 | 6/1990 | Carver et al. | 345/420 |
| 5,003,498 | 3/1991 | Ota et al. | 345/420 |
| 5,278,983 | 1/1994 | Kawabe et al. | 345/420 |
| 5,475,799 | 12/1995 | Yoshioka et al. | 345/420 |
| 5,675,720 | 10/1997 | Sato et al. | 345/420 |

FOREIGN PATENT DOCUMENTS 4-259809 9/1992 Japan .
5-196432 8/1993 Japan .

*Primary Examiner*—Mark R. Powell
*Assistant Examiner*—Huedung X. Cao
*Attorney, Agent, or Firm*—McDermott, Will & Emery

[57] ABSTRACT

Three-dimensional data processing device and three-dimensional data processing method for splicing together two pieces of three-dimensional data taken from different directions. Three-dimensional data and two-dimensional image data pertaining to a target object are inputted by a three-dimensional input camera from various directions. Two color images which are based on the two-dimensional image data inputted from two different directions are displayed on a display of a personal computer, and points of the two color images are specified by an operator. Two pieces of three-dimensional data corresponding to the two-dimensional image data are spliced together based on the points of the two color images (two-dimensional image data) by the personal computer.

22 Claims, 13 Drawing Sheets

THREE-DIMENSIONAL TO TWO DIMENSIONAL DATA PROCESSING AND CONVERSION DEVICE AND METHOD OF USING THE SAME

BACKGROUND OF THE INVENTION

1. Field of the Invention

The present invention pertains to a three-dimensional data processing device and a three-dimensional data processing method, and more particularly, a three-dimensional data processing device and a three-dimensional data processing method that splices together two pieces of three-dimensional data obtained from different directions.

2. Description of the Related Art

Conventionally, the light-section method is often used as the most practical means among various means to recognize the three-dimensional configuration of an object, for example. This light-section method is explained with reference to FIG. 1.

Camera 2 comprises semiconductor laser irradiating unit 5 and projecting optical system 8 to project in a slit configuration the laser light output from semiconductor laser irradiating unit 5 to target object 1. Semiconductor laser irradiating unit 5 can move from right to left or vice versa (the direction indicated by an arrow in the drawing) so that the slit light can be moved laterally.

Slit laser light S is irradiated onto target object 1 and a slit image of target object 1 that corresponds to slit light S is caught on the camera's image pick-up plane. Spatial coordinates of point p on the target object that corresponds to certain point p' on the slit image can then be obtained as the coordinates of the point at which plane S created by the slit light and straight line L connecting point p' and center point O of the lens of the image pick-up device (not shown in the drawing) intersect. In this way, the spatial coordinates of points on the surface of the target object that correspond to points on the slit image can be obtained from one image. By repeatedly moving the slit light laterally and repeating image input, three-dimensional data regarding the target object can be obtained.

Where the three-dimensional data for the entire target object is to be obtained, since image sensing as to only a certain range can be performed in one session, two or more image sensing sessions are carried out by changing the position of the camera or the position of the target object, and two or more pieces of three-dimensional data thus obtained are spliced together to create one piece of data pertaining to the entire target object.

Conventionally, two or more pieces of three-dimensional data that were obtained in the method described above are spliced together using conversion parameters calculated based on the position of the camera or the position of the rotary stage on that the target object is mounted, which are mechanically detected with high accuracy.

In the conventional method to splice together two or more pieces of three-dimensional data, it is necessary to mechanically detect the position of the camera or the position of the rotary stage with high accuracy, and if it is attempted to improve the accuracy in data splicing, the device would become very costly.

Moreover, there are cases where one would like to input three-dimensional data pertaining to the entire object without the use of equipment such as a rotary stage. In such a case, the orientation of the object or the position of the three-dimensional input camera must be manually changed. The user must then look for the same points on the target object in each adjacent piece of three-dimensional data as corresponding points such that data splicing can be done based on said corresponding points. However, when two pieces of three-dimensional data taken from two different directions are spliced together, points need to be sought in a condition in which the relative positional relationship between the pieces of three-dimensional data is quite unknown, which requires very complex and time consuming calculation.

It is therefore conceivable that three-dimensional configured images based on the pieces of three-dimensional data input from two different directions can be displayed and the user manually input the corresponding points of the images. However, in this case, because a three-dimensional configuration is displayed on a two-dimensional display device, it is difficult for the user to recognize the configuration at a glance and therefore the user cannot easily specify the corresponding points of the images.

SUMMARY OF THE INVENTION

The object of the present invention is to provide an improved three-dimensional data processing device and three-dimensional data processing method in which the problems described above are resolved.

Another object of the present invention is to provide a three-dimensional data processing device and three-dimensional data processing method that can perform splicing of three-dimensional data with high accuracy using an inexpensive construction.

Yet another object of the present invention is to provide a three-dimensional data processing device and three-dimensional data processing method in which corresponding points in two or more pieces of three-dimensional data input from two or more directions may be easily specified.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

A preferred embodiment of the present invention is explained below with reference to the drawings.

The three-dimensional data processing system of this embodiment comprises a three-dimensional input camera that inputs three-dimensional data and two-dimensional image data pertaining to the target object and a three-dimensional data processing device (personal computer) that splices together pieces of three-dimensional data based on the data obtained by means of said three-dimensional input camera.

Figure 1:
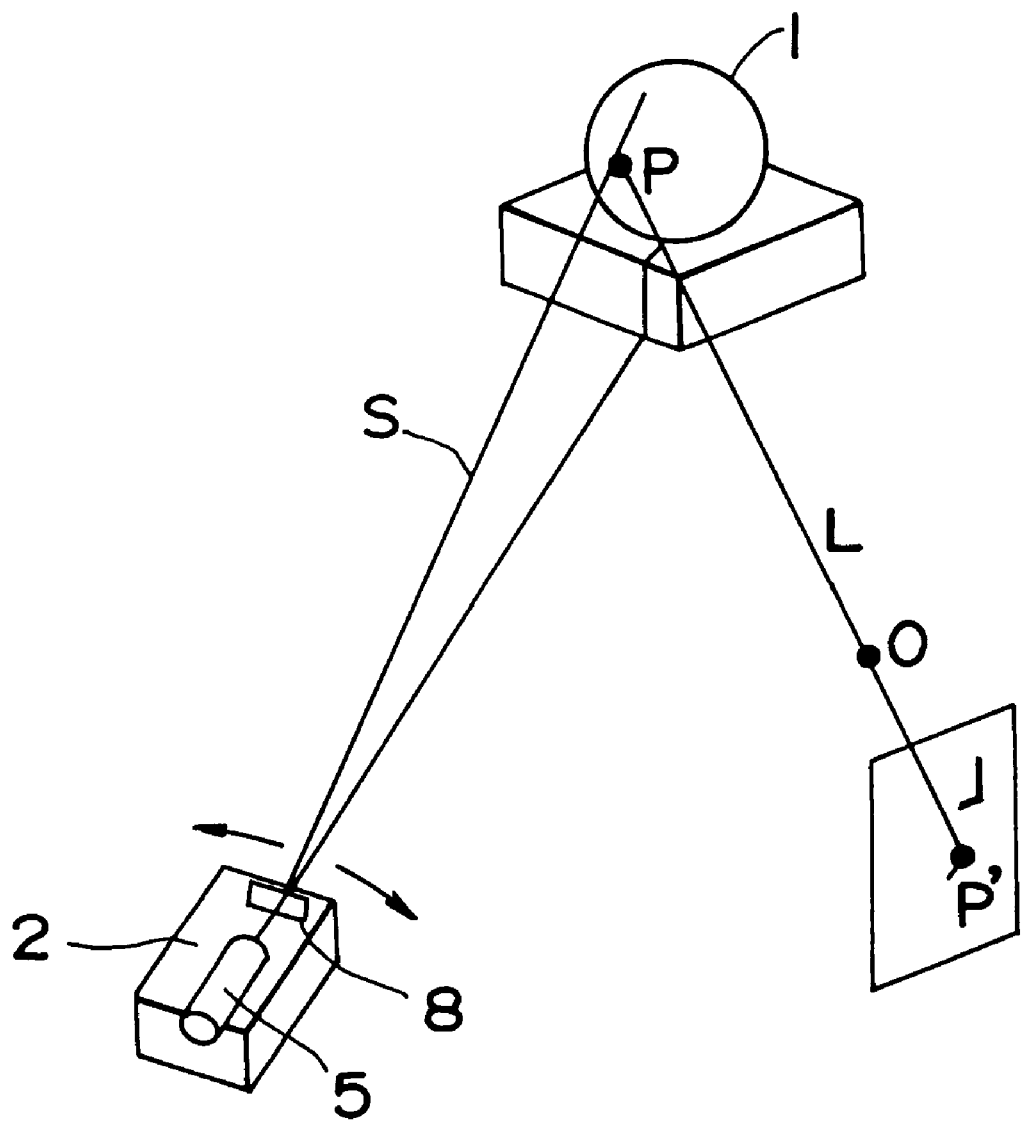
FIG. 1 is a drawing to explain the principle of the light-section method.
Figure 2:
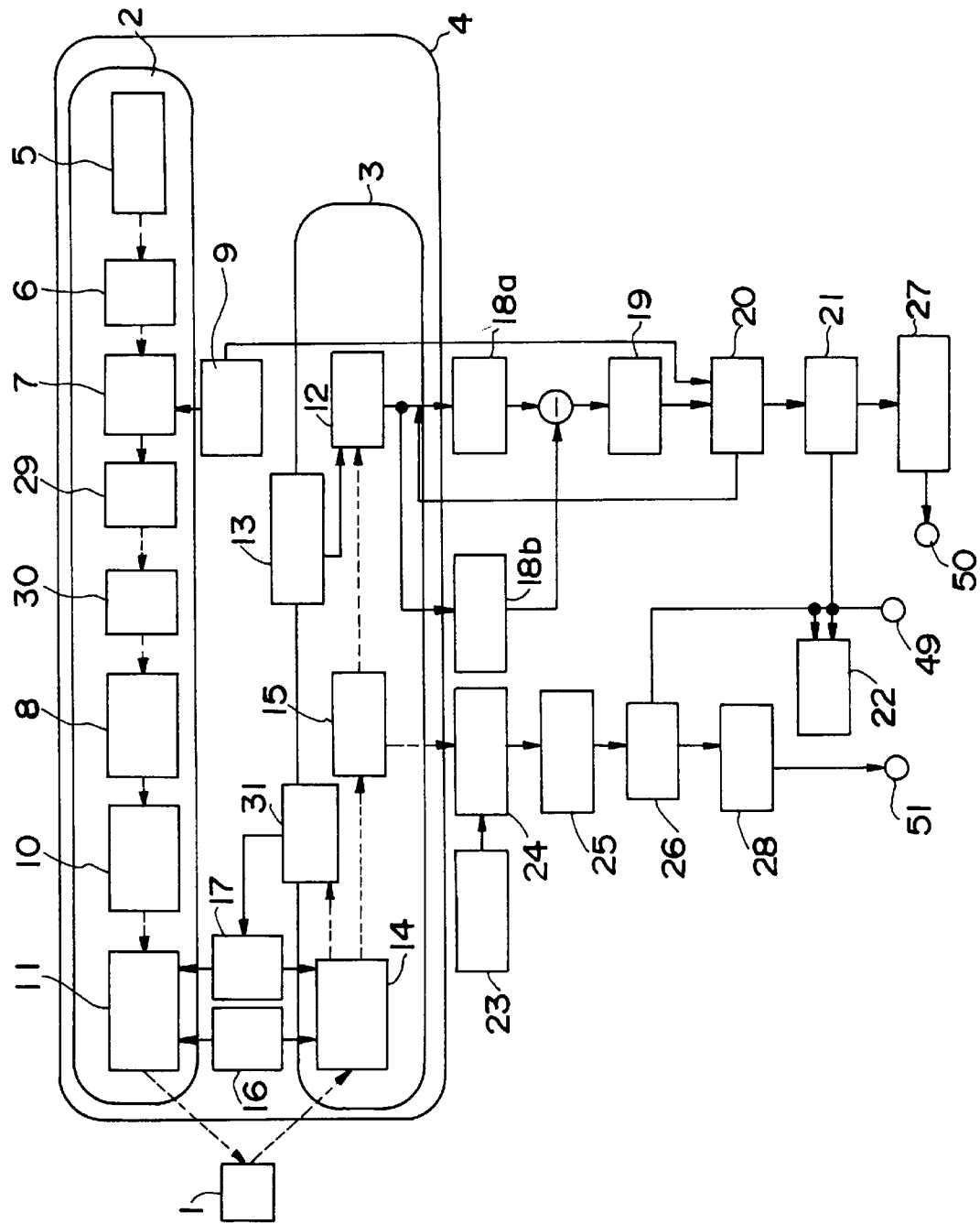
FIG. 2 is an outline block diagram pertaining to the three-dimensional input camera of this embodiment.

First, FIG. 2 shows an outline block diagram of the three-dimensional input camera used in the present invention.

This camera may be roughly divided into projecting optical system 2 that projects the laser light output by semiconductor laser 5 onto target object 1 as a slit light beam, and receiving optical system 3 that leads the projected laser light to image sensors 24 and 12 described below, said projecting optical system and receiving optical system being located on the same rotary stand 4. Other than the optical systems, the camera has a signal processing system that processes signals output from the sensors and generates a distance image and a color image, and a recording device that records the generated images. Solid line arrows in FIG. 2 show the flow of electric signals such as image signals and control signals, while dotted line arrows indicate the flow of the projected light. Detailed explanations regarding these optical systems are provided below.

To explain the outline of the signal processing system, with regard to the image obtained by distance image sensor 12, subtraction is performed between image 18a obtained with the projection of slit light and image 18b obtained without the projection of slit light, and incident light centroid position calculation process 19, distance information calculation process 20 and distance image generation process 21 are carried out regarding the image resulting from the subtraction. The distance image thus obtained is output to output terminal 50 via NTSC conversion process 27, or transferred to SCSI terminal 49 or built-in recording device 22 in its original digital signal form. Color image generation process 26 is carried out regarding the image obtained by color image sensor 24 after analog processing 25. The color image thus obtained is output to output terminal 51 via NTSC conversion process 28, or transferred to SCSI terminal 49 or recording device 22 in its original digital form. Distance image sensor 12 is driven by distance image sensor drive circuit 13 and color image sensor 24 is driven by color image sensor drive circuit 23.

Figure 3:
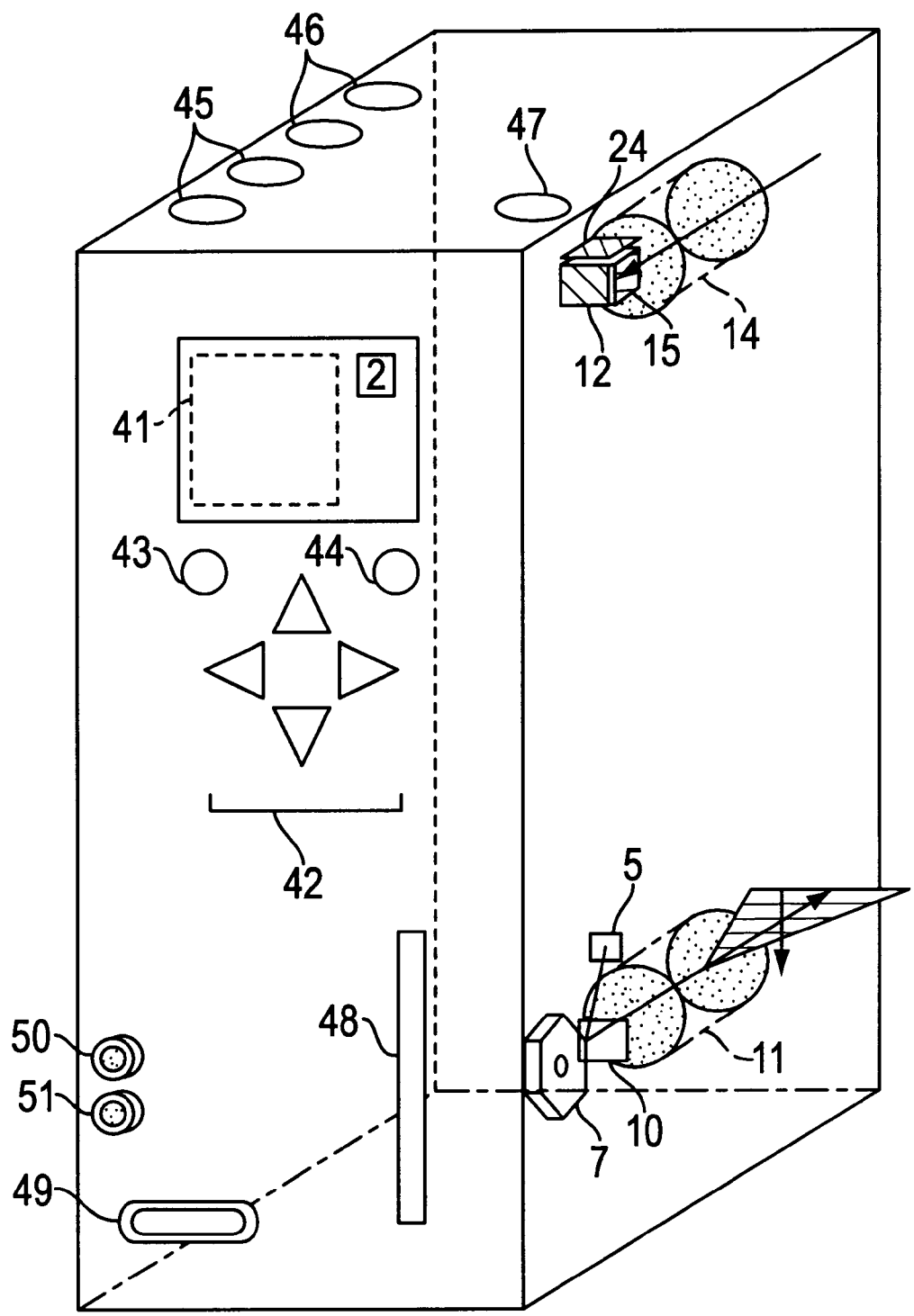
FIG. 3 is a perspective view outlining the construction of the three-dimensional input camera of this embodiment.

FIG. 3 shows a perspective view outlining the construction of the entire three-dimensional input camera.

LCD monitor 41 displays a color image sensed by color image sensor 24, three-dimensional data recorded in the built-in or an external recording device, or else various information, selection menus, etc. Cursor key 42, select key 43 and cancel key 44 are operation members to perform such things as image selection and mode setting from the menu. 45 is a zoom button to change the focal lengths of the projecting and receiving optical systems, and 46 is a MF button to perform manual focusing. 47 is a shutter button to input a distance image and a color image. As a recording device for sensed images, this camera has built-in drive device 48 for a photomagnetic disk (MO), mini-disk (MD), etc. Terminal 49 is a terminal to digitally input and output signals including image signals and is an SCSI or other interface. Distance image output terminal 50 and color image output terminal 51 are terminals to output images as analog signals. They output an image as video signals such as NTSC signals, for example.

The projection optical system vertically scans the target object by moving slit light that is longer in the horizontal direction. The light from semiconductor laser 5 is projected onto the target object via condenser lens 6, polygon mirror 7 rotated by projection scanning drive system 9, fθ lens 29, collimator lens 30, cylindrical lens 8, condenser lens 10 and projection zoom lens 11 (see FIG. 2). In FIG. 3, only a part of the projection optical system is shown.

The receiving optical system comprises distance image sensor 12 and color image sensor 24 placed on the photo-receptive image pick-up plane through receiving zoom lens 14, beam splitter 15, etc. Since the distance image and the color image are sensed using the same lenses, the distance image and the color image sensed at the same time have the same magnification and field of view. As long as the magnification and the field of view are the same, the distance image and the color image may be input separately. In this case, however, it is necessary to store the distance image and the color image input at the same magnification and field of view in such a way that they correspond to each other.

The projecting optical system is also equipped with a zoom function so that the optical system may be adjusted to the necessary magnification pertaining to the target object 1. The zoom function comprises power zoom (PZ) with which the user can select any angle of view and auto-zoom (AZ) in which the optical system is automatically adjusted to a pre-set angle of view. As the receiving optical system 3 is zoomed, projecting optical system 2 is controlled by AZ drive system 16 such that its angle of view matches that of receiving optical system 3 and projecting optical system 2 is zoomed such that its optical magnification is equal to that of receiving optical system 3 at all times. The focal point of the projecting zoom lens system is controlled by AF drive system 17 at the same time that the image pick-up system is controlled, based on a signal from auto-focus sensor 31 located in the image pick-up system, such that said focal point may have the same value as that of the image pick-up system, in accordance with the distance to the target object.

The image pick-up method and data processing of the three-dimensional data processing system pertaining to this embodiment are explained in detail below. The color image, color image data, distance image and distance image data may be hereinafter called the two-dimensional color image, two-dimensional color image data, three-dimensional configured image and three-dimensional data, respectively.

The section-by-section input of data for the entire target object using the present system will first be explained.

Section-by-section input means to sense the image of the target object on a section-by-section basis. Data for the entire target object is re-constructed by splicing together pieces of data based on the images sensed on a section-by-section basis in this way. Being equipped with such a function, a three-dimensional data processing system that can obtain data for the entire target object without missing any partial data can be realized.

A specific example is shown below to explain the image sensing operation to obtain data for the entire target object based on the section-by-section data input. In the explanation below, a case in which the target object cannot be moved is assumed. Therefore, it is also assumed that the three-dimensional input camera is moved around the target object such that image sensing may be performed from various viewpoints to obtain data for the entire target object. Naturally, section-by-section data input may also be performed while moving the target object.

Figure 4:
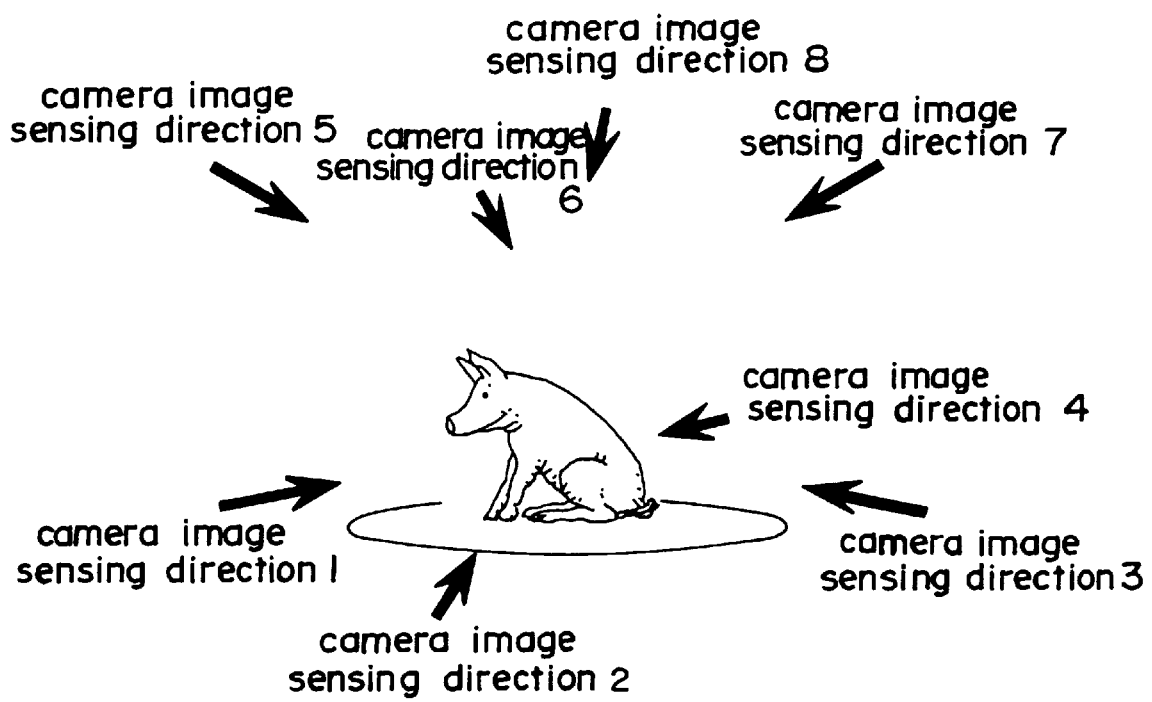
FIG. 4 is an image illustration showing the directions of image sensing using the camera.

With reference to FIG. 4, image sensing is first performed from a certain horizontal point (camera image sensing direction 1 in the drawing, indicated by an arrow). In this image sensing session, image sensing is performed by pressing shutter button 47 after setting the field of view that accommodates the entire target object (zooming) and the data thus obtained is saved. This data includes two-dimensional color image data sensed by color image sensor 24 and three-dimensional data sensed by distance image sensor 12. When the data is saved, it is given a file name.

The three-dimensional input camera is then moved approximately 90 degrees around the target object, after which image sensing is performed after setting the field of view that accommodates the entire target object, and the data thus obtained is saved in the same manner as in the previous session (camera image sensing direction 2 in the drawing, indicated by an arrow). This data is also given a file name. Following this second session, image sensing of the target object is performed from a position approximately 180 degrees from the initial position (camera image sensing direction 3 in the drawing, indicated by an arrow), and approximately 270 degrees from the initial position (camera image sensing direction 4 in the drawing, indicated by an arrow) and the data thus obtained is saved. The data is given a file name and saved each time.

A tripod, etc. is then attached to the three-dimensional input camera so that image sensing may be performed from above the target object. In this case, as well as in the image sensing from the horizontal directions, a field of view that accommodates the entire target object is set and image sensing is performed from four directions while the three-dimensional input camera is moved by approximately 90 degrees each time (camera image sensing directions 5–8 in the drawing, indicated by arrows). Data obtained from these directions is also given file names and saved.

As described above, data for sections of the target object sensed from a total of eight directions is obtained through image sensing sessions from four horizontal positions and four vertical diagonal positions. Image sensing for each section is performed such that data for bordering areas overlaps between two adjacent sections. This ensures that data for the entire surface of the target object, except for the bottom, comes to be included in the eight pieces of section data (two-dimensional color image data and three-dimensional data).

Using the three-dimensional data processing device, these pieces of section data thus saved are then spliced together into one piece of data for the entire target object. In this embodiment, a personal computer connected to the three-dimensional input camera is used as the three-dimensional data processing device, but the three-dimensional input camera may have a built-in three-dimensional data processing device instead.

Figure 5:
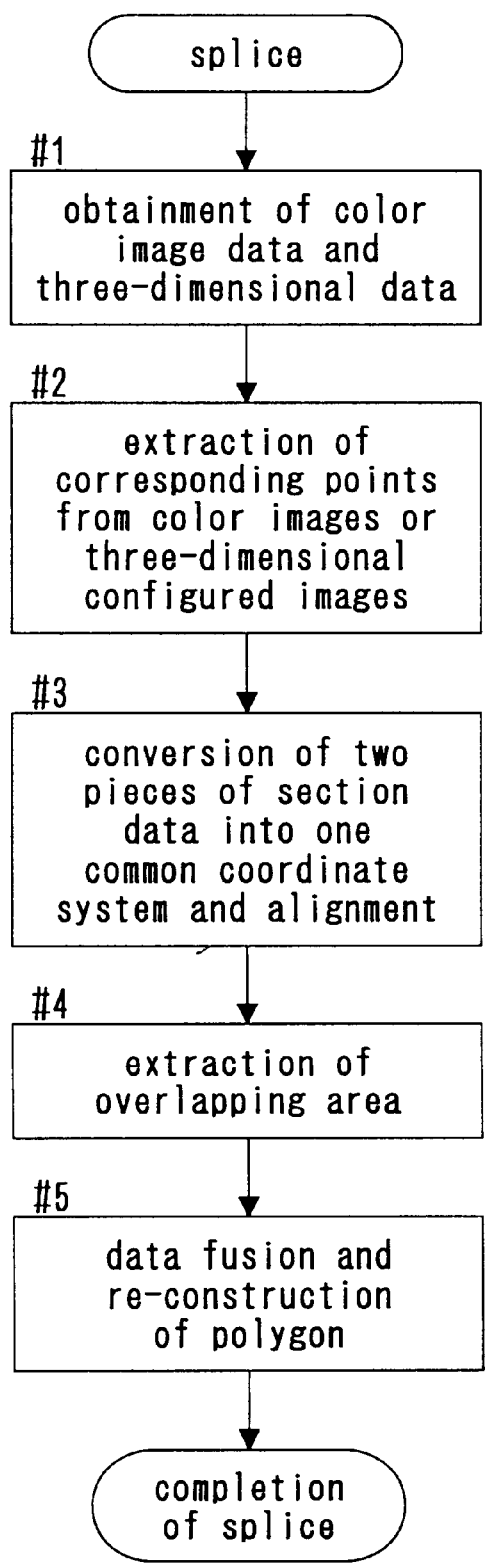
FIG. 5 is a flow chart showing the data splicing routine sequence.

FIG. 5 is a flow chart showing the sequence of the operation by personal computer 100, which is the three-dimensional data processing device, in which three-dimensional data obtained on a section-by-section basis is spliced together.

Figure 6:
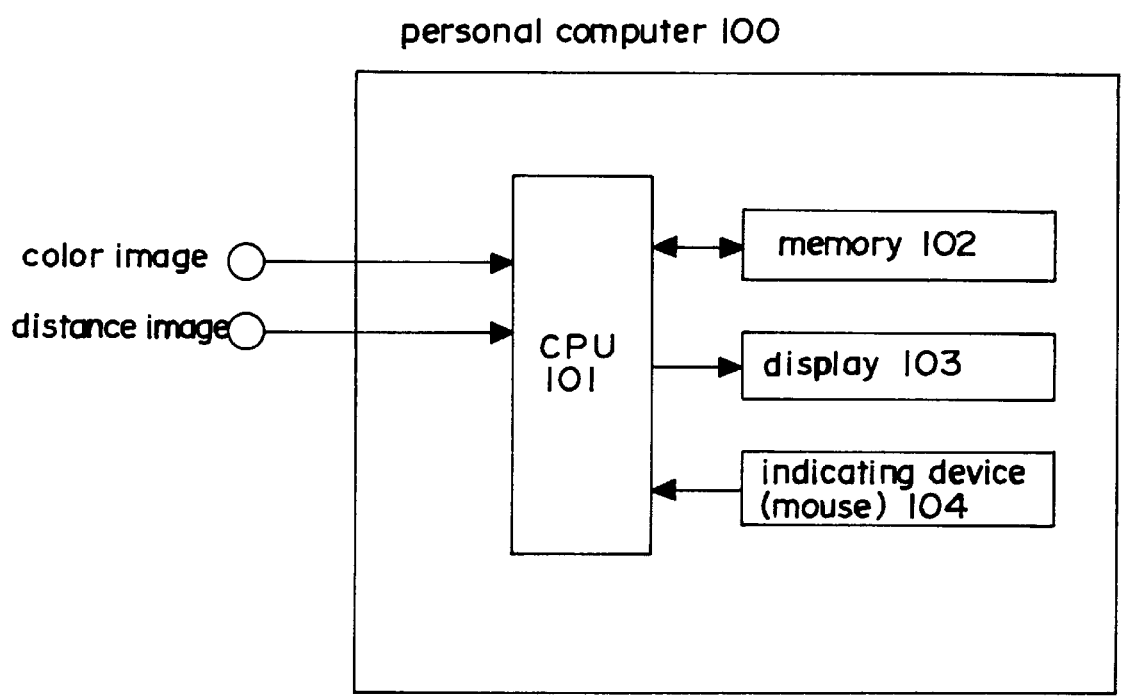
FIG. 6 is an outline block diagram pertaining to the three-dimensional data processing device of this embodiment.

FIG. 6 is a block diagram of personal computer 100. This personal computer 100 comprises CPU 101, a data input means that inputs two-dimensional color image data and three-dimensional data (distance image) to CPU 101, memory 102 that saves the two-dimensional color image data and three-dimensional data thus input, display 103 that displays two-dimensional color image and three-dimensional configured image, and indicating device 104 (a mouse is used in this embodiment) used for file selection and corresponding point selection (described in detail below). Where data processing is performed inside the camera, LCD monitor 41 functions as display 103.

First, the pieces of two-dimensional color image data and the pieces of three-dimensional data taken from various directions and saved in memory device 48 of the three-dimensional input camera are input to personal computer 100 (step #1). Specifically, the pieces of two-dimensional color image data and the pieces of three-dimensional data obtained from respective directions and saved in memory device 48 of the three-dimensional input camera are input to personal computer 100 together with their file names. The data thus input is saved in memory 102.

Figure 7:
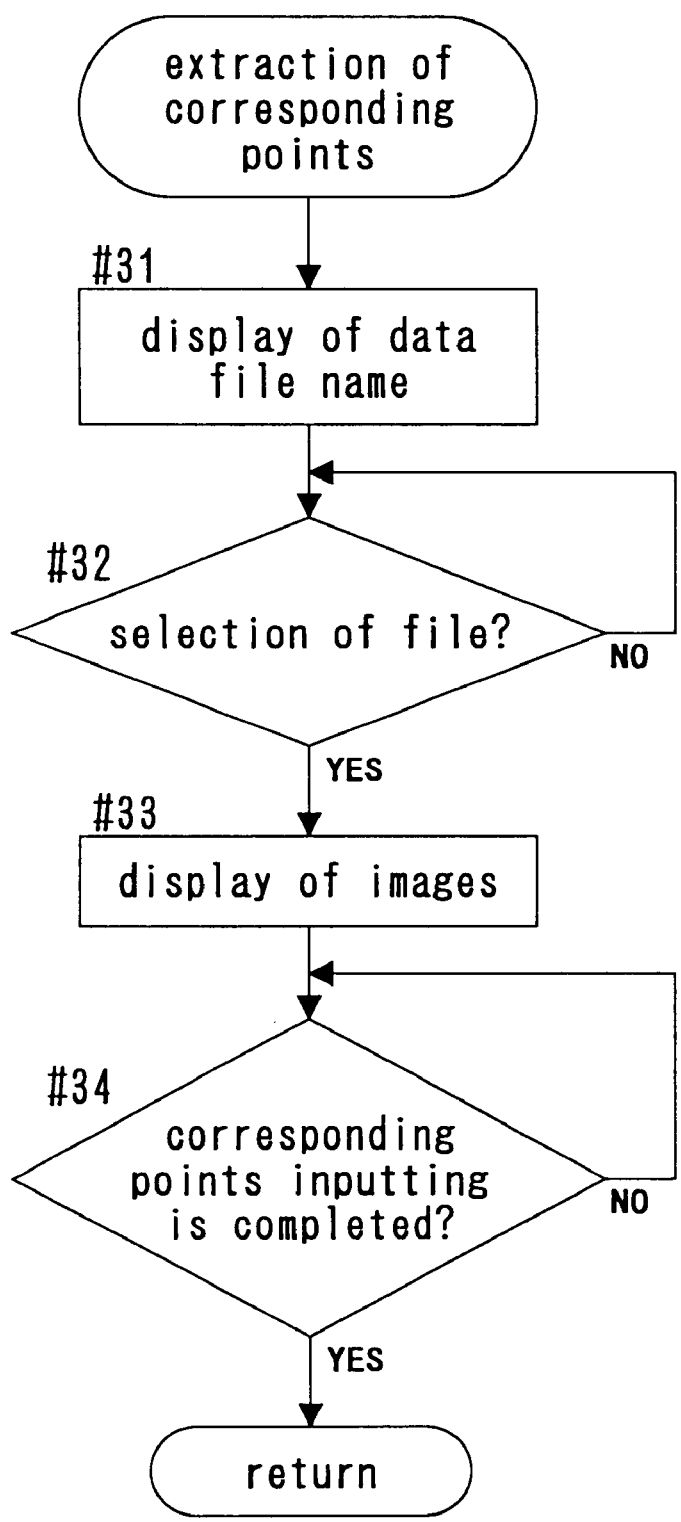
FIG. 7 is a flow chart showing the sequence of the corresponding points extraction routine.
Figure 8:
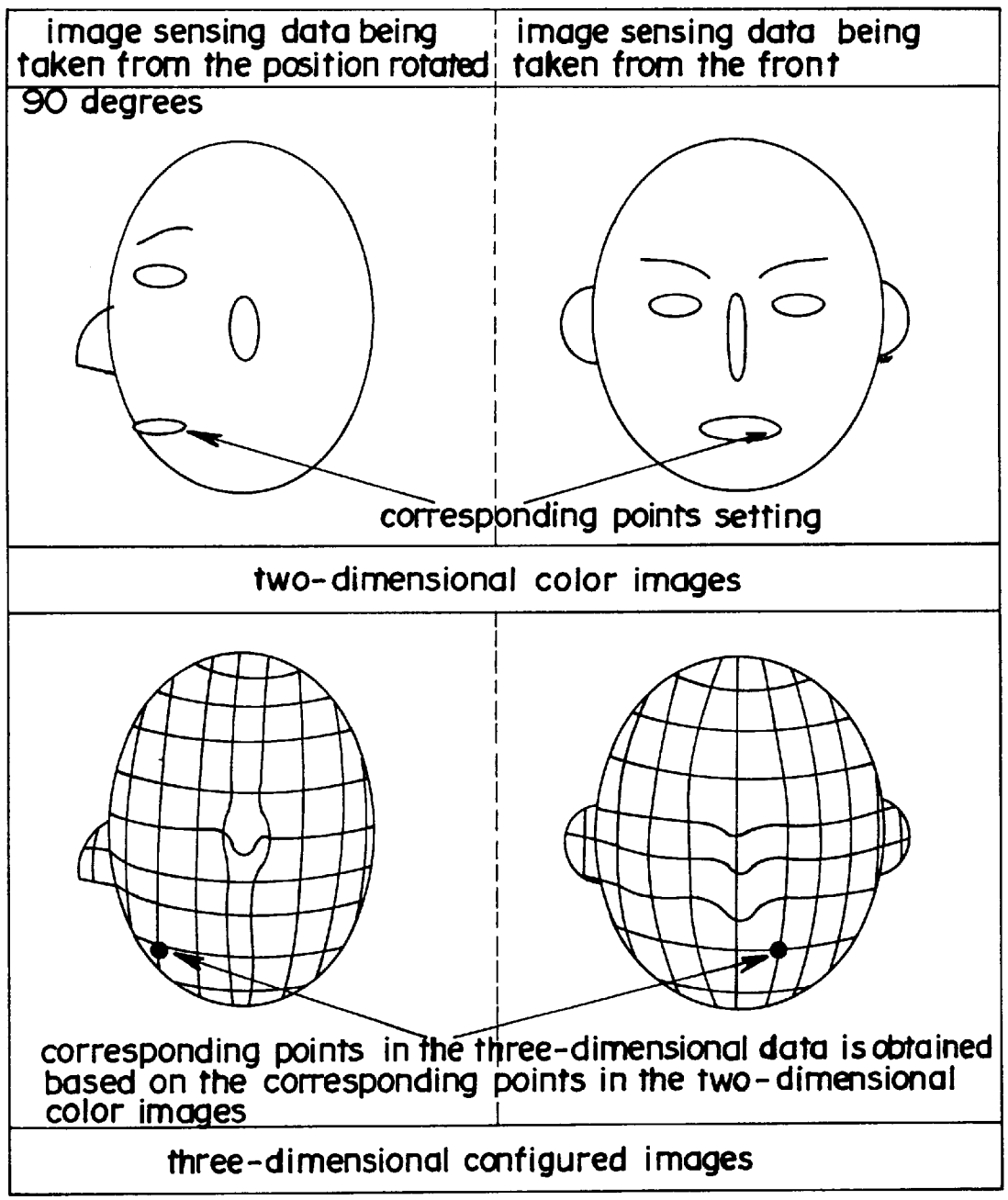
FIG. 8 is a drawing showing the display while corresponding points are being specified.

Two-dimensional color images or three-dimensional configured images based on two adjacent pieces of section data are then compared and corresponding points are selected (step #2). The method to extract these corresponding points will be explained with reference to the flow chart shown in FIG. 7.

First, data file names saved in memory 102 are displayed on display 103 (step #31). The user selects from the displayed file names the file names of the pieces of data that the user desires to splice together (step #32). It is also acceptable to provide an identification code that corresponds to the target object (the same identification code is given to data for the same target object) such that pieces of data having the same identification code are automatically selected.

Images based on the pieces of data selected in step #32 are then displayed (step #33). In this display, two-dimensional color images based on two pieces of two-dimensional color image data and three-dimensional configured images based on two pieces of three-dimensional data are displayed side by side, said pieces of data being taken from two directions. Where two or more pieces of data (file names) have been selected in step #32, images based on any two of said pieces of data are first displayed, and the images shown are then switched through the operation of indicating device 104. In this case, the user repeats this operation until two-dimensional color images and three-dimensional configured images pertaining to two adjacent pieces of section data are displayed side by side.

In this condition, the user specifies corresponding points in the adjacent pieces of section data. Specification of corresponding points is performed using indicating device 104. Specifically, the pointer displayed on display 103 (not shown in the drawing) is moved using the mouse and corresponding points are set by clicking the mouse on them. Where corresponding points are specified using the two-dimensional color images, they may be selected by finding color change points and comparing color distributions around them. It is also possible to specify corresponding points directly from the three-dimensional configured images. In this case, corresponding points may be selected by extracting local configuration change points and comparing their configuration characteristics.

When the input of corresponding points is complete (step #34), the process returns to the main routine and advances to the next step. The routine to specify corresponding points is deemed completed if four or more corresponding points have been input.

The process now returns to the flow chart shown in FIG. 5. In step #3, two adjacent pieces of three-dimensional data are spliced together into one piece of data. However, coordinates used in each piece of three-dimensional data saved in memory 102 are coordinates relative to the position of the three-dimensional input camera when that piece of data was obtained, and the pieces of section data do not share one coordinate system. Therefore, in order to splice these pieces of three-dimensional data together into one piece of data for the entire target object, it is necessary to re-express each piece of section data using one common coordinate system.

The method to convert each piece of section data into one common coordinate system is explained below.

Since the position of the three-dimensional input camera when each piece of section data was obtained is not recorded, conversion parameters are sought based on the corresponding points of two-dimensional color image data or three-dimensional data selected in step #2.

The derivation of the conversion parameters to convert each piece of section data into one common coordinate system will now be explained.

Figure 9:
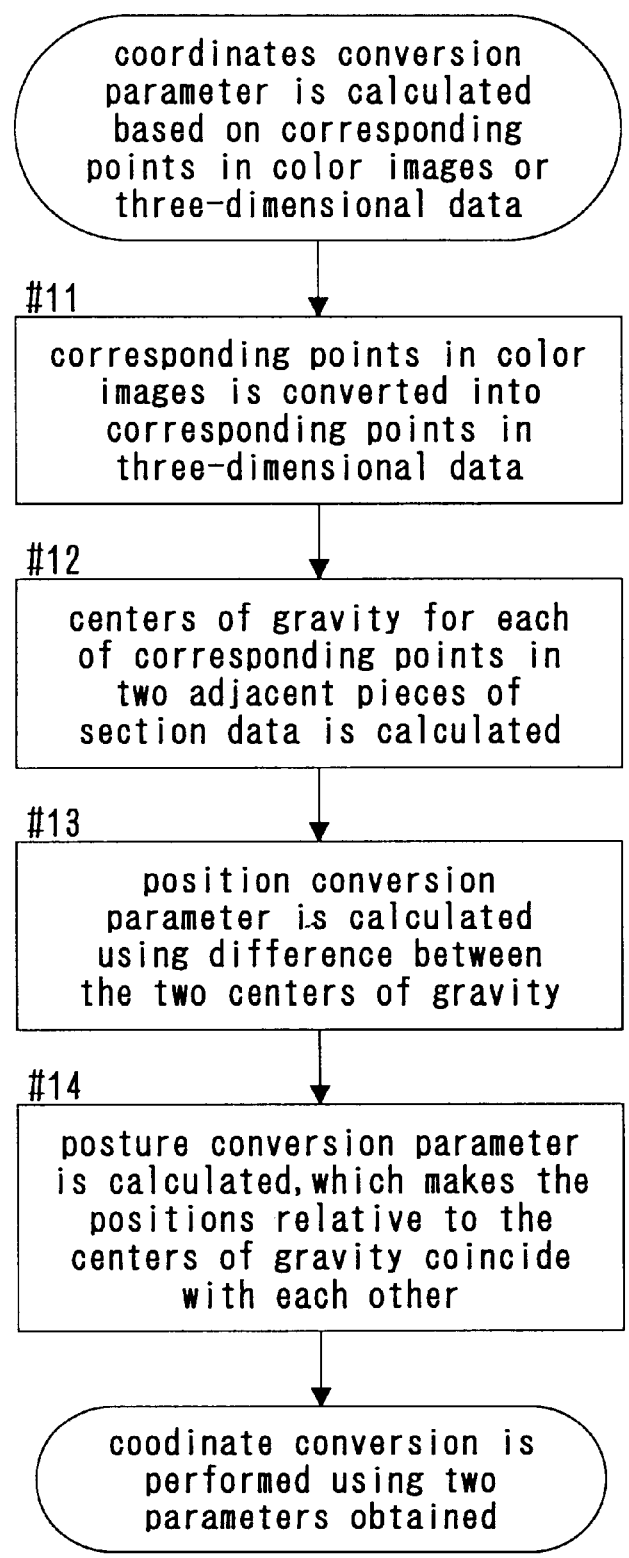
FIG. 9 is a flow chart showing the sequence of the conversion parameter calculation routine.

FIG. 9 is a flow chart showing the sequence of the conversion parameter calculation routine.

First, corresponding points specified on the two-dimensional color images are converted into corresponding points on the three-dimensional data. (step #11). This conversion is not needed as to corresponding points specified on the three-dimensional configured images.

Since two-dimensional color image data and three-dimensional data are obtained using the same field of view (from the same direction), it is known what points correspond to what other points (positions). Therefore, corresponding points specified on the two-dimensional color images can be converted into corresponding points on the three-dimensional data.

Although the field of view for two-dimensional color image data and the field of view for three-dimensional data are the same as described above, where they have different resolutions (a case where the resolution of the two-dimensional color image data is approximately twice that of the three-dimensional data, for example), the following processing is required. The following processing is not shown in the flow chart shown in FIG. 9.

Figure 10:
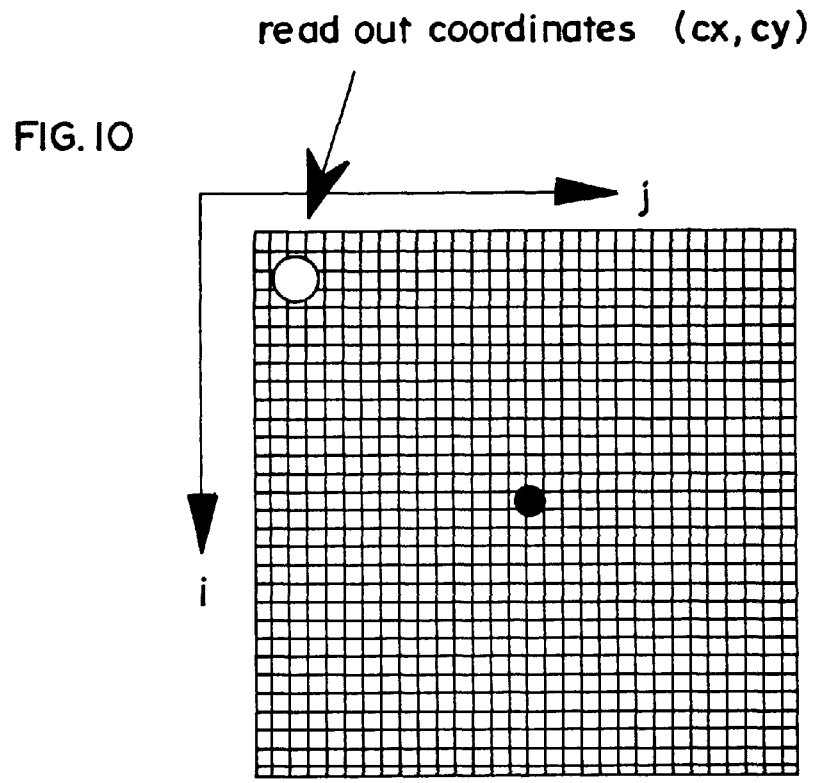
FIG. 10 is a drawing showing the coordinates of two-dimensional color image data.
Figure 11:
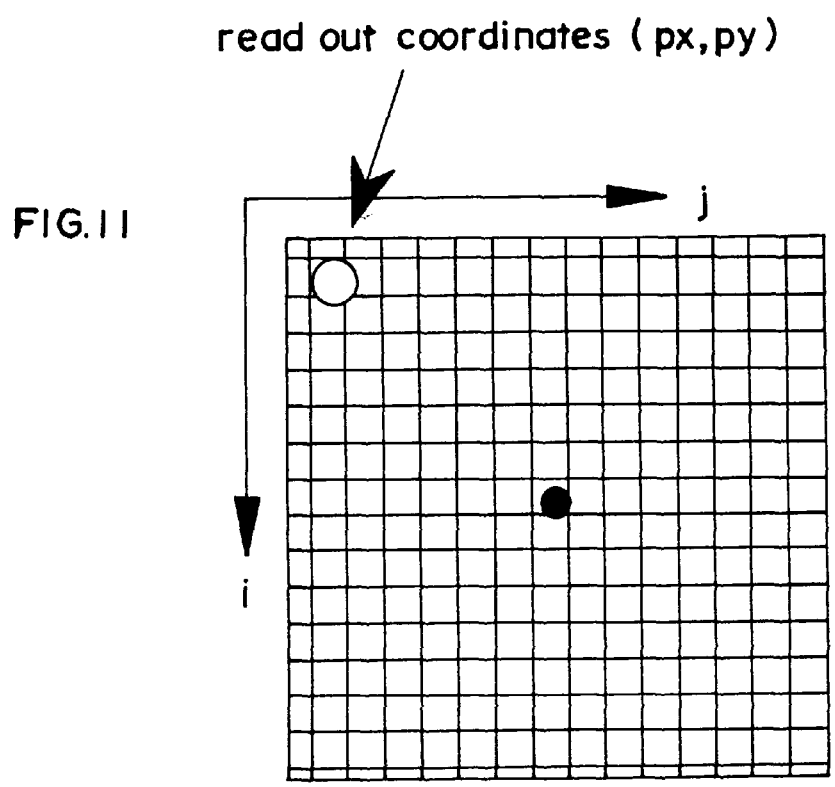
FIG. 11 is a drawing showing the coordinates of three-dimensional data.

Two-dimensional color image data and three-dimensional data are stored in two-dimensionally aligned memory regions (see FIGS. 10 and 11). Data located at coordinates (i, j) in the two-dimensional color image data is expressed as C[i][j]. Data located at coordinates (i, j) is expressed as P[i][j]. Since the scales of the coordinate systems are different between the two-dimensional color image data and the three-dimensional data, the same coordinates do not represent the same positions. In other words, C[i][j] and P[i][j] are not data at the same position.

Therefore, in order to represent the same position using the same coordinates in both the two-dimensional color image data and the three-dimensional data, the coordinates are corrected.

Figure 12:
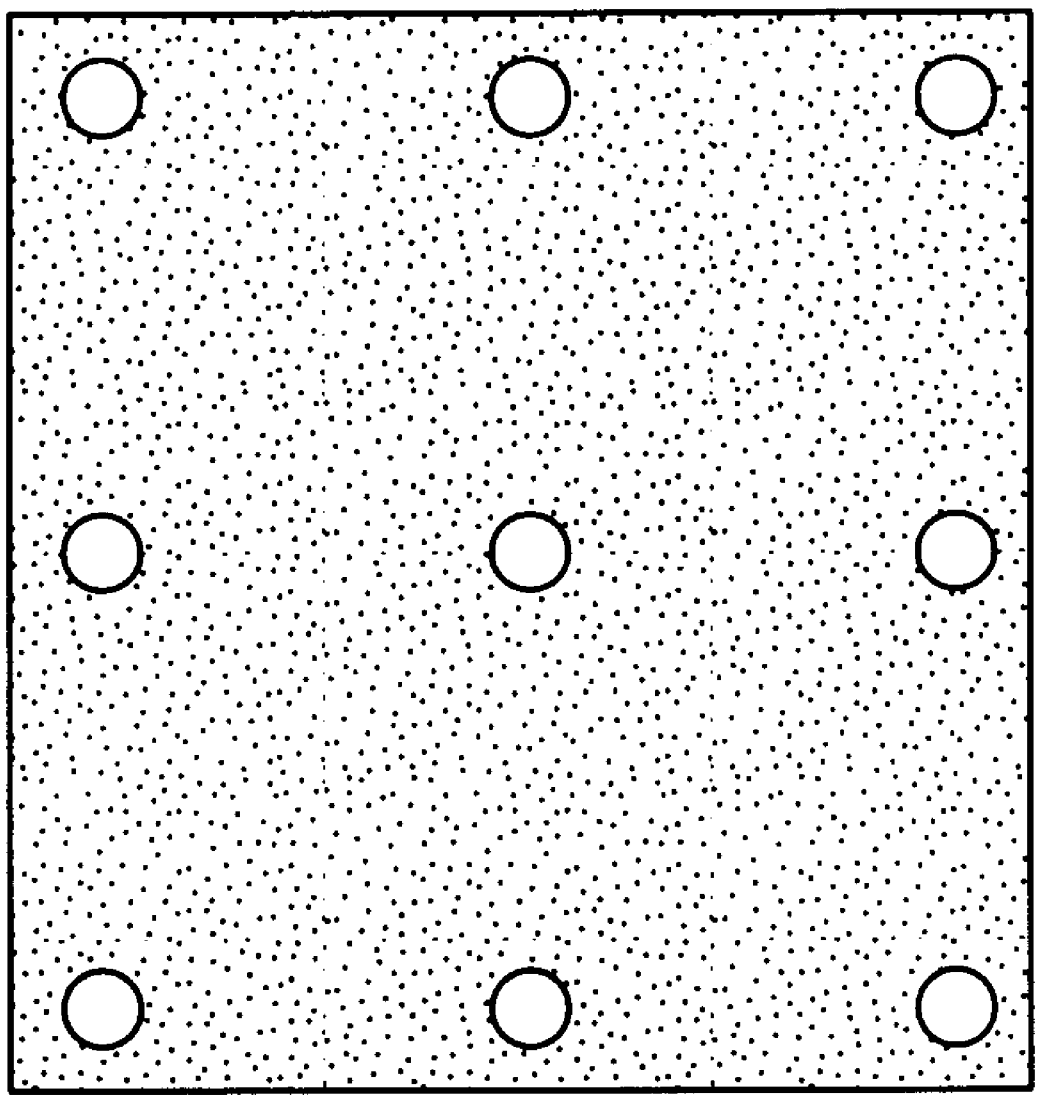
FIG. 12 is a drawing showing the chart used in coordinate correction.

First, using the chart shown in FIG. 12, the center coordinates of a circle of the chart are read on the two-dimensional color image data and the three-dimensional data. The center coordinates of the circle of the chart read on the two-dimensional color image data are (cx, cy) (see FIG. 10). The center coordinates of the circle of the chart read on the three-dimensional data are (px, py) (see FIG. 11). The center coordinates of the coordinate system in the two-dimensional color image data are (cx0, cy0) and the center coordinates of the coordinate system in the three-dimensional data are (px0, py0) (indicated by black circles in FIGS. 10 and 11).

Here, k1 and k2 that satisfy the following equations are sought.

$(px-px0)=k1\times(cx-cx0)$ $(py-py0)=k2\times(cy-cy0)$

These k1 and k2 become the coordinate correction coefficients.

When data C [Tx][Ty] on the two-dimensional color image data is given, coordinates (Fx', Fy') on the three-dimensional data that correspond to this point are obtained using the following equations.

$Fx'=k1\times(Tx-cx0)+px0$ $Fy'=k2\times(Ty-cy0)+py0$

Therefore, the three-dimensional data that corresponds to data C[Tx][Ty] on the two-dimensional color image data is data P[Fx][Fy] on the three-dimensional data that has as its indices integers Fx and Fy which are closest to Fx' and Fy'.

Where there are four or more corresponding points of three-dimensional data in-two adjacent pieces of section data, conversion parameters to convert each piece of section data into one common coordinate system can be obtained using the following calculation. If the number of corresponding points is three or less, however, since the plane formed based on the corresponding points cannot be specified (for example, even if an image is upside down, it is recognized as said image with the right side up), conversion parameters cannot be obtained.

Here, $P1_1, P1_2, \ldots, P1_n$ are corresponding points in the first piece of section data and $P2_1, P2_2, \ldots, P2_n$ are corresponding points in the second piece of section data. In other words, $P1_n$ and $P2_n$ correspond to each other. The parameters to convert the second piece of section data into the coordinate system of the first piece of section data are T and R. T is a position conversion parameter (parallel movement component) and R is a posture conversion parameter (rotary movement component). Using these conversion parameters, the second piece of section data is converted into the same coordinate system as that of the first piece of section data via the following equation (1).

Equation 1

$$P'2_n = R\times(P2_n - T) \quad (1)$$

$P'2_n$ is data value $P2_n$ of the second piece of section data after it is converted into the coordinate system of the first piece of section data.

Returning to the flow chart shown in FIG. 9, the derivation of parameters T and R will now be explained.

First, the centers of gravity pertaining to the corresponding points of the first and second pieces of section data are obtained using a public domain method (step #12).

Using these centers of gravity for the corresponding points, position conversion parameter T is obtained using the following equation (2) (step #13).

Equation 2

$$T=\Sigma(P2_i)/n - \Sigma(P1_i)/n \quad (2)$$

This parameter makes the centers of gravity of the corresponding points of the first and second pieces of section data coincide with each other.

Posture conversion parameter R is obtained by seeking R' that makes J the smallest in equation (3) (step #14).

Equation 3

$$J=\Sigma|(P1_k - \Sigma(P1_1)/n) - R' \times (P2_k - T - \Sigma(P1_1)/n)| \quad (3)$$

This parameter makes the positions of corresponding points of the first and second pieces of section data relative to their respective centers of gravity coincide with each other.

Using conversion parameters T and R obtained in this way, coordinate conversion is carried out via equation (1). Because the second piece of section data becomes represented in the same coordinate system as the first piece of section data by the coordinate conversion, the first piece of section data and the second piece of section data can be now aligned together (step #3). If the numbers of corresponding points in the respective pieces of section data are increased here, more accurate conversion parameters can be obtained and the pieces of section data can be aligned together with more accuracy.

Returning to the flow chart shown in FIG. 5, when the alignment is complete, three-dimensional data fusion is carried out. In the explanation below, 'section data' refers to three-dimensional data. Here the data in the overlapping areas of two adjacent pieces of section data is extracted (step #4). The first piece of section data at the overlapping area and the second piece of section data at the overlapping area are fused into one piece of data such that new three-dimensional data may be generated (step #5).

Figure 13:
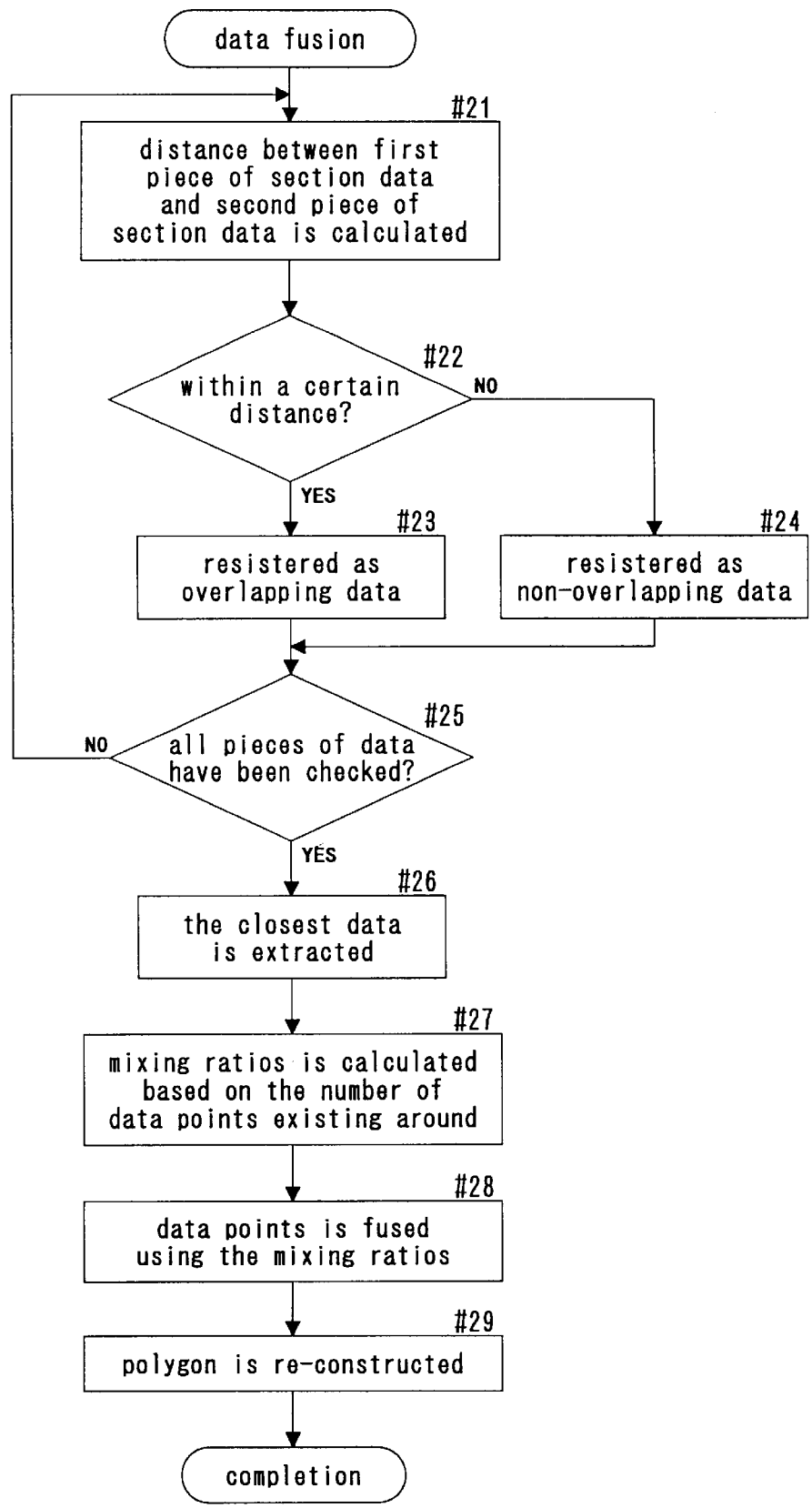
FIG. 13 is a flow chart showing the sequence of the data fusion routine.

FIG. 13 is a flow chart showing the sequence of the data fusion routine. First, the overlapping areas of the first piece of section data and the second piece of section data are extracted. In the overlapping areas, a point of the second piece of section data which is closest to a certain point of the first piece of section data is found and the distance between said two points is calculated (step #21), and it is then determined whether this distance is equal to or smaller than a certain value (step #22). Where it is determined in step #22 that the distance is equal to or smaller than a certain value, these two pieces of data are deemed to be overlapping and they are registered as overlapping pieces of data (step #23). Conversely, where it is determined in step #22 that the distance is larger than a certain value, these pieces of data are deemed not to be overlapping and they are registered as non-overlapping pieces of data (step #24).

It is determined whether the determination as to overlapping has been completed with regard to all pieces of data (step #25). If it has not been completed, the processes in steps #21 through #24 are repeated. When all pieces of data have been checked, the process advances to step #26.

In step #26, points of the second piece of section data that are closest to points of the first piece of section data and that are registered in step #23 (those deemed to be overlapping) are set as matching points. Points of the first piece of section data that are closest to the points of the second piece of section data that were deemed to be overlapping are set as matching points (step #26).

Next, data for the matching points is fused. During fusion, if the mixing ratios of the data belonging to the first piece of section data and the data belonging to the second piece of section data are the same, where errors are included in the alignment, stair-steps may occur. In order to prevent these stair-steps, the mixing ratios are changed depending on the location of the data point.

Figure 14:
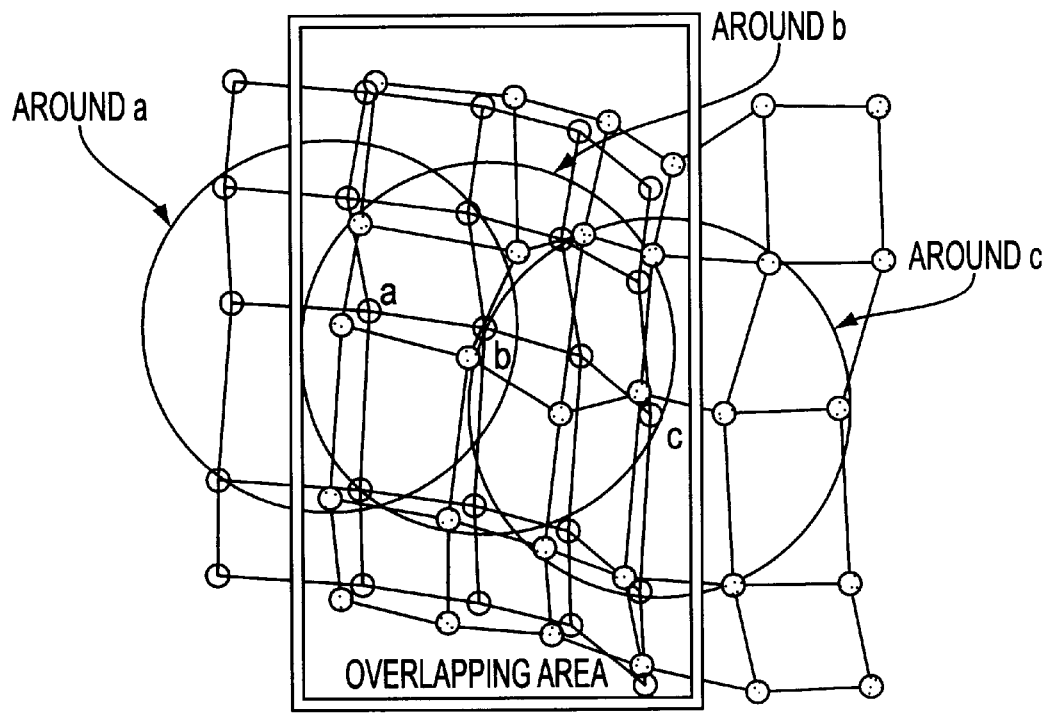
FIG. 14 is a drawing showing data before data fusion is carried out.

FIG. 14 is a drawing to explain data fusion. In the drawing, white circles indicate data points of the first piece of section data and black circles indicate data points of the second piece of section data.

As shown in FIG. 14, if the mixing ratios for the area around matching points a are set such that priority is placed on the first piece of section data, the mixing ratios for the area around matching points b are set to be approximately 1:1, and the mixing ratios for the area around matching points c are set such that priority is placed on the second piece of section data, smooth splicing in which no stair-steps appear will be possible. In this embodiment, these mixing ratios are calculated based on the number of data points existing in a certain distance around the central matching points to be fused. Since there are eight data points in the first piece of section data and four data points in the second piece of section data in the area around matching points a, the mixing ratios for the first piece of section data and the second piece of section data are set at 8:4 for the area around matching points a. Similarly, since there are eight data points in the first piece of section data and eight data points in the second piece of section data in the area around matching points b, the mixing ratios for the first piece of section data and the second piece of section data are set at 8:8 for the area around matching points b. Since there are five data points in the first piece of section data and nine data points in the second piece of section data in the area around matching points c, the mixing ratios for the first piece of section data and the second piece of section data are set at 5:9 for the area around matching points c (step #27). Using these mixing ratios, the data in the overlapping areas is fused together (step #28). Consequently, appropriate data fusion will become possible.

Finally, three-dimensional data is generated regarding the fused data points (step #29). In other words, three-dimensional data before the data fusion is maintained with regard to non-overlapping areas and new three-dimensional data is generated for the areas in which data fusion occurred, so that the first and second pieces of section data may be spliced together into one piece of data. The data splicing process is thus completed.

Figure 15:
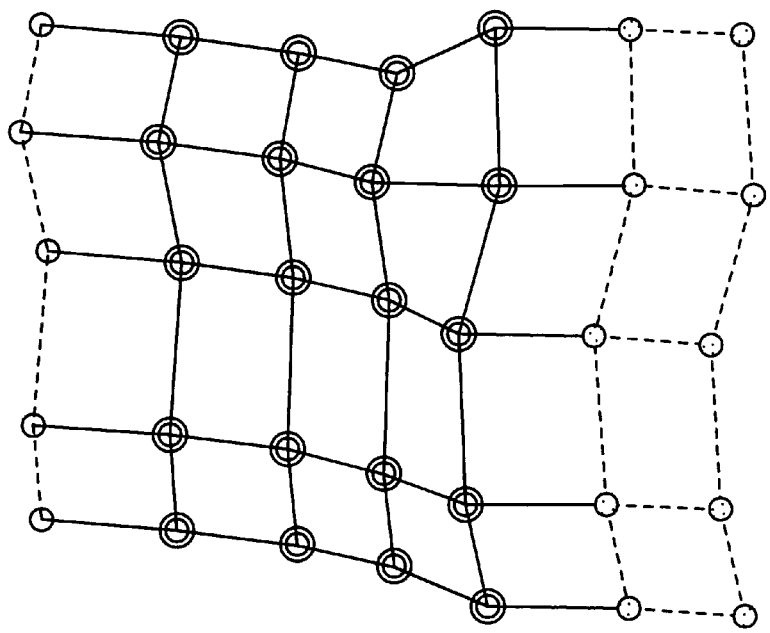
FIG. 15 is a drawing showing data after data fusion is carried out.

FIG. 15 shows the result of the data splicing. In FIG. 15, double circles represent data points at which data fusion occurred, white circles represent data points at which the first piece of section data is maintained, and black circles represent data points at which the second piece of section data is maintained. Dotted lines represent lines surviving the data fusion while solid lines represent re-constructed lines.

Where three or more pieces of section data are spliced together, the data splicing process described above is repeated. In this case, however, when coordinate conversion parameters are sought, it is necessary to perform calculation such that errors in alignment are distributed among the coordinate conversion parameters for the respective splicing areas. For example, when the entire target object is covered by m pieces of section data ($P1_n, P2_n, P3_n, \ldots, Pm_n$) spliced together, if conversion parameters R and T are sequentially sought for each pair of adjacent pieces of section data, errors become accumulated at the end and the position of the first piece of section data and the position of the last piece of section data may be quite off from each other. Therefore, these errors are distributed among the conversion parameters for respective pairs.

Regarding position conversion parameter T, error amount α for the entire target object is expressed using the following equation (4).

Equation 4

$$\alpha = \Sigma T_{ij} \quad (4)$$

Here, conversion parameter T is corrected such that error amount α for the entire target object may be divided by m, which is the number of splicings. Corrected conversion parameter T' is expressed by the following equation (5).

Equation 5

$$T'_{ij} = T_{ij} - \alpha/m \quad (5)$$

With regard to posture conversion parameter R as well, the error amount for the entire target object is divided into m, the number of splicings.

Alignment is performed using the coordinate conversion parameters obtained in this way and m pieces of section data are sequentially spliced together using the same method used for the splicing of two pieces of data. In this way, data for the entire target object, in which all pieces of data are spliced together, can be obtained in the end.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A three-dimensional data processing device comprising:
    a memory means for memorizing first and second pieces of three-dimensional data indicating a three-dimensional configuration of a target object, and first and second pieces of two-dimensional color image data for said target object, wherein the first piece of three-dimensional data and the first piece of two-dimensional color image data are taken from a first direction, and the second piece of three-dimensional data and the second piece of two-dimensional color image data are taken from a second direction which is different from the first direction;
    a points specifying means for specifying points of the first piece of two-dimensional color image data and of the second piece of two-dimensional color image data; and
    a splicing means for splicing together the first piece of three-dimensional data and the second piece of three-dimensional data based on the points of the first and second pieces of two-dimensional color image data which are specified by said points specifying means.

2. A three-dimensional data processing device as claimed in claim 1, wherein said points specifying means includes a display means for simultaneously displaying a first two-dimensional image based on the first piece of two-dimensional dimensional image data and a second two-dimensional image based on the second piece of two-dimensional image data, and an indicating means for indicating points of the first and second two-dimensional images displayed on said display means.

3. A three-dimensional data processing device as claimed in claim 2, wherein said display means displays first and second three-dimensional configured images based on the first and second pieces of three-dimensional data together with the first and second two-dimensional images.

4. A three-dimensional data processing device as claimed in claim 1, wherein said splicing means includes a conversion means for converting the points of the first and second pieces of two-dimensional image data that are specified by said points specifying means into points of the first and second pieces of three-dimensional data.

5. A three-dimensional data processing system comprising:
    a three-dimensional data input means for inputting pieces of three-dimensional data indicating a three-dimensional configuration of a target object from two or more different directions;
    a two-dimensional color image data input means for inputting pieces of two-dimensional color image data for the target object from the same directions as for the three-dimensional data input by said three-dimensional data input means;
    a memory means for memorizing the pieces of three-dimensional data input by said three-dimensional data input means and the pieces of two-dimensional color image data input by said two-dimensional color image data input means, wherein said piece of three-dimensional data and piece of two-dimensional color image data taken from the same direction are related to each other;
    a points specifying means for specifying points of a first piece of two-dimensional image data input from a first direction and a second piece of two-dimensional image data input from a second direction; and
    a splicing means for splicing together a first piece of three-dimensional data corresponding to the first piece of two-dimensional color image data and a second piece of three-dimensional data corresponding to the second piece of two-dimensional color image data based on the points of the first and second pieces of two-dimensional color image data that are specified by said points specifying means.

6. A three-dimensional data processing system as claimed in claim 5, wherein said points specifying means includes a display means for simultaneously displaying a first two-dimensional image based on the first piece of two-dimensional image data and a second two-dimensional image based on the second piece of two-dimensional image data, and an indicating means for indicating points of the first and second two-dimensional images displayed on said display means.

7. A three-dimensional data processing system as claimed in claim 6, wherein said display means displays first and second three-dimensional configured images based on the first and second pieces of three-dimensional data together with the first and second two-dimensional images.

8. A three-dimensional data processing system as claimed in claim 5, wherein said splicing means includes a conversion means for converting the points of the first and second pieces of two-dimensional image data that are specified by said points specifying means into points of the first and second pieces of three-dimensional data.

9. A method of processing a three-dimensional data comprising the following steps of:
    a first step for memorizing first and second pieces of three-dimensional data indicating a three-dimensional configuration of a target object, and first and second pieces of two-dimensional color image data for said target object, wherein the first piece of three-dimensional data and the first piece of two-dimensional color image data are taken from a first direction, and the second piece of three-dimensional data and the second piece of two-dimensional color image data are taken from a second direction which is different from the first direction;

a second step for specifying points of the first piece of two-dimensional color image data and the second piece of two-dimensional color image data; and a third step for splicing together the first piece of three-dimensional data and the second piece of three-dimensional data based on the points of the first and second pieces of two-dimensional color image data that are specified in the second step.

10. A method of processing a three-dimensional data as claimed in claim 9, said second step includes the following steps:

a step for simultaneously displaying a first two-dimensional image based on the first piece of two-dimensional image data and a second two-dimensional image based on the second piece of two-dimensional image data;

a step for indicating points of the first and second two-dimensional images displayed in the previous step.

11. A method of processing a three-dimensional data as claimed in claim 9, said third step includes a step for converting the points of the first and second pieces of two-dimensional image data that are specified in the second step into points of the first and second pieces of three-dimensional data.

12. A three-dimensional data processing device comprising:

a memory for memorizing first and second pieces of three-dimensional data indicating the three-dimensional configuration of a target object, and first and second pieces of two-dimensional image data for the target object, wherein the first piece of three-dimensional data and the first piece of two-dimensional image data are taken by sensing the target object from a first direction, and the second piece of three-dimensional data and the second piece of two-dimensional image data are taken by sensing the target object from a second direction different from the first direction;

point specifying means for specifying the points of the first piece of two-dimensional image data and the second piece of two-dimensional image data; and splicing means splicing together the first piece of three-dimensional data and the second piece of three-dimensional data based on the points of the first and second pieces of two-dimensional image data specified by the points specifying means to obtain spliced three-dimensional data indicating the three-dimensional configuration of a part of the target object or the entire target object.

13. A three-dimensional data processing device as claimed in claim 12, wherein said points specifying means includes a display unit for simultaneously displaying a first two-dimensional image based on the first piece of two-dimensional image data and a second two-dimensional image based on the second piece of two dimensional image data, and indicating means for indicating points of the first and second two-dimensional images displayed on said display unit.

14. A three-dimensional data processing device as claimed in claim 13, wherein said display unit displays first and second three-dimensional configured images based on the first and second pieces of three-dimensional data together with the first and second two-dimensional images.

15. A three-dimensional data processing device as claimed in claim 12, wherein said splicing means includes conversion means for converting the points of the first and second pieces of two-dimensional image data specified by said points specifying means into points of the first and second pieces of three-dimensional data.

16. A three-dimensional data processing system comprising:

an image sensing device for sensing a target object from two or more different directions to take pieces of three-dimensional data indicating a three-dimensional configuration of the target object and pieces of two-dimensional image data for the target object;

a memory for memorizing the pieces of three-dimensional data and the pieces of two-dimensional image data taken by said image sensing device, wherein a piece of three-dimensional data and a piece of two-dimensional image data taken from the same direction are related to each other;

points specifying means for specifying points of a first piece of two-dimensional image data taken from a first direction and a second piece of two-dimensional image data taken from a second direction different from the first direction; and splicing means for splicing together a first piece of three-dimensional data corresponding to the first piece of two-dimensional image data and a second piece of three-dimensional data corresponding to the second piece of two-dimensional image data based on the points of the first and second pieces of two-dimensional image data specified by said points specifying means to obtain spliced three-dimensional data indicating the three-dimensional configuration of a part of the target object or the entire target object.

17. A three-dimensional data processing system as claimed in claim 16, wherein said points specifying means includes a display unit for simultaneously displaying a first two-dimensional image based on the first piece of two-dimensional image data and a second two-dimensional image based on the second piece of two-dimensional image data, and indicating means for indicating points of the first and second two-dimensional images displayed on said display unit.

18. A three-dimensional data processing system as claimed in claim 17, wherein said display unit displays first and second three-dimensional configured images based on the first and second pieces of three-dimensional data together with the first and second two-dimensional images.

19. A three-dimensional data processing system as claimed in claim 16, wherein said splicing means includes conversion means for converting the points of the first and second pieces of two-dimensional image data specified by said points specifying means into points of the first and second pieces of three-dimensional data.

20. A method of processing three-dimensional data comprising the steps of:

(1) memorizing first and second pieces of three-dimensional data indicating the three-dimensional configuration of a target object, and first and second pieces of two-dimensional image data for the target object, wherein the first piece of three-dimensional data and the first piece of two-dimensional image data are taken by sensing the target object from a first direction, and the second piece of three-dimensional data and the second piece of two-dimensional image data are taken by sensing the target object from the second direction different from the first direction:

(2) specifying the points of the first piece of two-dimensional image data and the second piece of two-dimensional image data; and (3) splicing together the first piece of three-dimensional data and the second piece of three-dimensional data based on the points of the first and second pieces of two-dimensional image data specified in the second step to obtain spliced three-dimensional data indicating the three-dimensional configuration of a part of the target object or the entire target object.

21. A method of processing three-dimensional data as claimed in claim 20, wherein said second step further includes the steps of:

(4) simultaneously displaying a first two-dimensional image based on the first piece of two-dimensional image data and a second two-dimensional image based on the second piece of two-dimensional data; and (5) indicating points of the first and second two-dimensional images displayed in the preceding step.

22. A method of processing three-dimensional data as claimed in claim 20, wherein said third step further includes a step of converting the points of the first and second pieces of two-dimensional image data specified in the second step into points of the first and second pieces of of three-dimensional data.

* * * * *